Nov. 22, 1949     A. P. SHEARER     2,488,943
METHOD OF MAINTAINING ACID CATALYST CONCENTRATION
IN AN ALKYLATION PROCESS
Filed Aug. 30, 1944
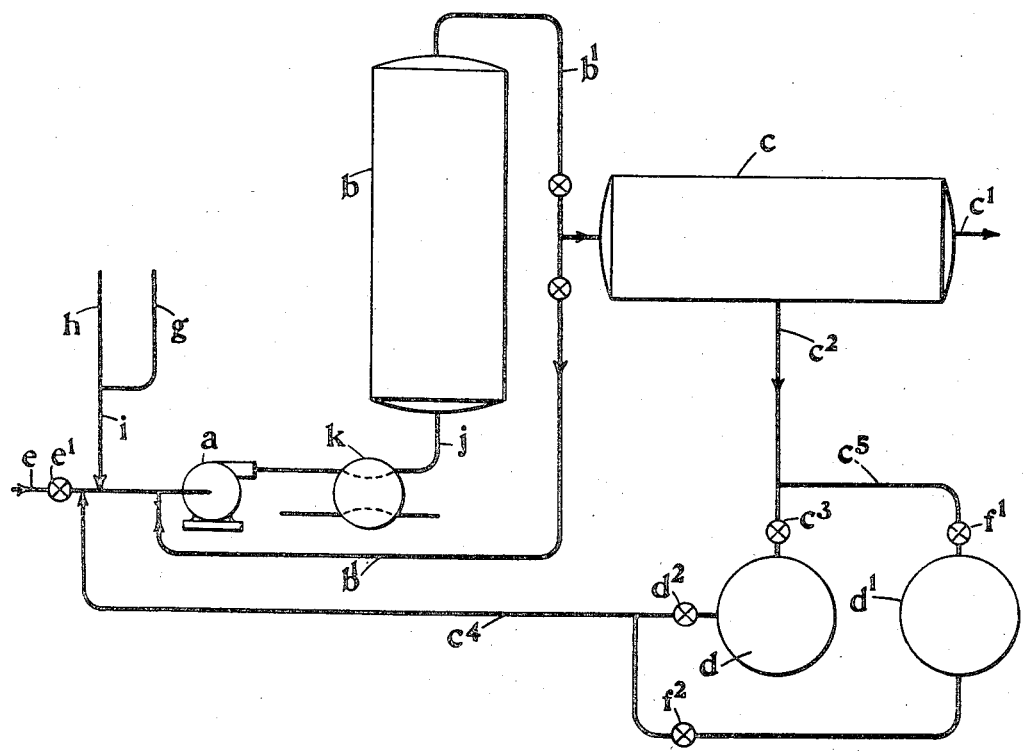
Inventor:
Alexander Paterson Shearer
By Hobart N. Durham
Attorney Patented Nov. 22, 1949

2,488,943

UNITED STATES PATENT OFFICE 2,488,943

METHOD OF MAINTAINING ACID CATALYST CONCENTRATION IN AN ALKYLATION PROCESS

Alexander Paterson Shearer, Sunbury-on-Thames, England, assignor to Anglo-Iranian Oil Company Limited, London, England, a British joint-stock corporation Application August 30, 1944, Serial No. 551,934
In Great Britain September 22, 1943

4 Claims. (Cl. 260—683.4)

This invention relates to the use of liquid alkylation catalysts such as concentrated sulfuric acid, hydrofluoric acid or other sulphur acids such as chlorsulphonic acid, and to processes in which they are employed for the alkylation with one or more olefins, of organic compounds such for example as the lower isoparaffin isobutane or isopentane, for the production of hydrocarbons boiling in the motor fuel range.

The applicant has found that in the use of concentrated sulphuric acid in such processes of alkylation, there is a fall in acid strength, probably due to side reactions between the catalyst and the reactants, and that both the yield of alkylate and the quality of that fraction derived from it that comes within the motor spirit boiling range, are closely related to acid strength. Furthermore, it is common experience that in industrial alkylation plants the use of acid of a concentration below 90% is uneconomic, and it is usual to make additions of 98% acid in order to maintain the acid concentration at 90% for the production of a "standard" alkylate. In relation to the quantity of acid in the system the proportion of 98% acid added is small, and does not result in any effectual increase in acid concentration above 90%. Since quality of the alkylate is thus related to acid strength, it follows that one way of producing an alkylate of higher than a standard quality (such as produced for example with a 90% concentration of acid, is to use acid of higher concentration; but this with existing methods of handling acid would require a substantial increase in the proportion of the "make-up" acid used, a higher overall acid consumption and a corresponding increase in operational costs, although a somewhat higher yield of alkylate of better quality would thus be produced.

The invention has among its objects to carry out such processes of alkylation in the presence of acid of higher average concentration than employed at the present day, without sacrifice in overall yield of the alkylated product and with no increase in the overall acid consumption.

The process of alkylation of lower paraffins such as isobutane or isopentane with one or more of the lower olefins (except ethylene), which comprise propene, iso- or normal butenes, lower polymerides of isobutene, or a C₄ fraction, being a gas containing such olefins or a condensation product of such olefins, is carried out in known manner in the presence of sulphuric acid of high concentration and at a temperature in the range —10° C. to +30° C., while intimately mixing the acid and reactants in the vigorous stirring of the reaction mixture during the period of contact, to yield a liquid alkylation product from which hydrocarbons of high octane number boiling in the motor spirit range may be separated by distillation, the isoparaffin reactant being present in substantial or considerable excess of equimolecular or equivalent proportions reacting with the olefins to yield the alkylation product. The reaction mixture is thereupon allowed to settle, and to separate in a supernatant layer upon the acid, whereupon it is distilled for the recovery therefrom of hydrocarbons boiling in the motor spirit range. The process of alkylation carried out under the conditions described is the subject of the applications Serial Nos. 155,918 filed July 27, 1937, now Patent No. 2,363,300 granted November 21, 1944, and 379,442 filed February 18, 1941, now Patent No. 2,363,301 granted November 21, 1944, while conditions for carrying out the process in a succession of stages in the presence of isoparaffin in considerable excess of equimolecular or other equivalent proportions with respect to the olefine reactant, is the subject-matter of application Serial No. 288,569, filed August 5, 1939, and now abandoned.

In operating a batch alkylation process in which the sulphuric acid has an initial high concentration such as 98%, and is degraded under the conditions of the process to a 90% concentration, the average acid concentration throughout the reaction may for example be 94%, and the reaction product will therefore be of higher quality than that which would have been produced in a continuous plant in which the concentration throughout was not substantially above 90%. If in continuous operation under known conditions the use of acid of 90% concentration gives a satisfactory alkylate, then in a batch process the reaction may be continued until the acid is degraded under the conditions of the process to a concentration appreciably below 90%, without the overall quality of the product falling below a satisfactory level. Thus it is our experience that for a given quality of product more alkylate will be produced per lb. of acid in a batch process than in a continuous process. The applicant has however found that acid consumption per gallon of alkylate to a given acid discard strength of 90% is substantially the same in continuous and in batch acid operations.

The invention presents conditions under which the advantages of both continuous and batch operations are achieved, whereby either a higher quality of alkylate may be produced or a higher yield of the same quality of alkylate may be produced for the same acid consumption.

The plant usually employed in either batch or continuous operation for the alkylation of isoparaffins essentially comprises a unit or units consisting of a reaction vessel equipped with means for maintaining the reaction mixture consisting of the isoparaffin and olefin reactants and the acid catalyst, intimately mixed during the period of contact, and a settling tank, the plant unit or units being so equipped that the reactants and acid may be admitted to the reaction vessel, and at the conclusion of the operation the reaction mixture and acid passed to the settling tank, the latter being so equipped as to permit the separated reaction mixture and acid passing out according to the determined processing conditions.

According to the invention the process of alkylation is carried out in an operational cycle divided into a number of periods or stages that may be of the same or different length as may be determined, whereby in the first period or stage the reactor of the plant unit may be charged with sulphuric acid of a high concentration such for example as 98%, and a quantity of "make-up" acid added in or throughout the period, which together with the acid first charged to the unit makes up the total average acid consumption for the operational cycle. Thus at the end of the first period there will be available in the plant unit a volume of acid of concentration appreciably above 90%, while during that period an alkylate of much better than "standard" quality will have been produced (that is to say, better than that produced in the use of acid of 90% concentration).

According to the invention moreover the partially used and degraded acid produced in one period or stage is passed into and stored in a balance tank or tanks for further use in a succeeding period or stage of the operational cycle. Thus the partially used and degraded acid produced in the first period or stage may be passed to and stored in a balance tank for further use in the second period or stage in the same plant unit or another unit. In the second period or stage, the partially used and degraded acid from the balance tank is used as "make-up" acid in the same quantity as in the first period or stage. The acid discarded in the second period and still of concentration above 90% is similarly used in a third period, and so on in other successive periods or stages until the acid falls to or below a 90% strength. During the last period or stage, therefore, alkylate of "standard" quality may be produced, while in each of the preceding periods alkylate of quality better than "standard" quality is produced. The various qualities of alkylate produced may either be segregated or be bulked together according to the conditions of the operational cycle. In this way for the same acid consumption not only is there obtained an alkylate of better quality than that obtained under known conditions, but a somewhat higher yield.

The process hereinbefore described may be continued for one or more further periods in which the acid used is degraded appreciably below 90% concentration, and in those stages an alkylate below "standard" quality produced. The process may thus be continued until the acid has been degraded to 85% concentration, or even lower, whereby the alkylate produced in the respective periods or stages may be bulked together in such proportions as to yield a composite alkylate of "standard" quality or better. Thus for the same acid consumption an appreciably higher yield of "standard" quality alkylate is obtained than in normal continuous operation.

The balance tank or balance tanks may be added to the customary equipment of, for example a continuous plant for the alkylation of isoparaffins, the total acid required for a given cycle charged to the plant, being contained partly in the plant proper and partly in a balance tank or balance tanks.

During operation the reaction mixture including the acid catalyst is kept rapidly circulating, whereby turbulent conditions are maintained and the advantages of batch and continuous operation are secured in a modified system of batch operation.

According to the invention moreover a portion only of the average total acid supplied to a plant unit, such as a continuous alkylation plant in an operational cycle is charged to the unit, the plant proper being charged to its capacity and the remainder of the acid charged to a balance tank or balance tanks. As before the acid in the balance tanks is circulated as rapidly as possible to the reaction zones, while the acid from the settling tanks is returned to the balance tanks, but in addition "make-up" acid of a high concentration such as 98% is added from an external source at a rate such that the amount added in the operational cycle, together with the amount originally added to the plant will not exceed, but may be less than the total acid which would have been supplied to a similar plant over the same period of continuous operation under known conditions. By such means an improved form of batch operation is attained together with an advantage accruing from the injection of fresh acid.

The invention comprises the processing conditions as hereinafter described.

The invention is diagrammatically illustrated by way of example in the accompanying drawing that represents a single stage continuously operating unit for the alkylation of isobutane or isopentane, in which $a$ indicates the circulation pump, $b$ the reaction vessel, $c$ the settling tank, while $d$ and $d^1$ respectively indicate the balance and/or storage tanks.

As shown in the diagram, the plant is a single stage continuous unit, but the invention is equally applicable to a multi-stage unit, or to a batch unit.

In carrying the invention into effect in the plant diagrammatically illustrated in the accompanying drawing and according to the first embodiment hereinbefore referred to, fresh acid of high concentration such for example as 98%, is fed through the pipe line $e$ and valve $e^1$ through a high speed centrifugal pump $a$, while the isoparaffin and olefin advantageously after first being reduced in temperature by passage through a heat exchanger, are fed respectively through the pipe lines $g$, $h$ and $i$ in their passage together through the pipe line $e$ and through the centrifugal pump $a$, wherein the reactants and acid are subjected to highly turbulent intermixture, the resulting emulsion being then passed through the delivery pipe line $j$ into the reactor $b$.

The ratio of isoparaffin/olefin (being the so-called "external" ratio) in the pipe line $i$ should, for satisfactory operation, be at least 5:1, but is advantageously considerably more.

The reactor $b$ is maintained at a temperature in the range −10 to +30° C. and at a pressure sufficiently high to maintain the liquid phase, the isoparaffin being there alkylated. The emulsion leaving the reactor passes through pipe line $b^1$ into the settling tank $c$ which is of such a large capacity that quiescent conditions are there maintained, whereby the hydrocarbons separate in a supernatant layer upon the acid. A part of the emulsion is advantageously recycled through the pipe line $b^1$ by the circulation pump $a$. The reactants and acid are cooled before their admission to the reactor $b$ as by the refrigerant cooler $k$, and the emulsion is recycled in quantity sufficient to maintain a ratio of isoparaffin to olefin of from 50–1 to 150–1 (being the so-called "internal" ratio) in the pipe line $j$.

The hydrocarbon product, including the unreacted isoparaffin from the settling tank $c$ leaves through pipe line $c^1$ and is thereafter subjected to distillation for the separation and refining of the alkylate in known manner, and the unreacted isoparaffin may be recycled through the plant unit. The acid from the settling tank $c$ passes through pipe line $c^2$ and valve $c^3$ into the balance or storage tank or tanks such as $d$.

During the first period of operation fresh acid may be charged at a rate equivalent for example to three times the rate normally employed in continuous operation under known conditions of alkylation of isoparaffins, and for this period the valves $e^1$ and $c^3$ are kept open, and valves $d^2$, $f^1$ and $f^2$ are closed.

During the second period of operation, valves $e^1$, $c^3$ and $f^2$ are kept closed and valves $d^2$ and $f^1$ are kept open. The acid is drawn from the tank or tanks $d$ through pipe line $c^4$ and valve $d^2$, at the same rate as during the first period of operation. As before, the acid passes to the circulation pump $a$ and the emulsion leaving the pump $a$ is admixed as before with isoparaffin and olefin feedstock passing through the pipe lines $g$, $h$ and $i$, and as before the emulsion passes to the reactor $b$ and then through the pipe line $b^1$ to the settling tank $c$, and as before a similar quantity of emulsion may be recycled to the circulation pump $a$. The acid leaving the settling tank $c$ passes through lines $c^2$ and $c^5$ and valve $f^1$ into the tank or tanks $d^1$.

During the third period of operation, valves $e^1$, $d^2$ and $f^1$ are closed, and valves $c^3$ and $f^2$ are opened. The operation is the same as before described, except that the acid is drawn from the tank or tanks $d^1$, while the acid returning from the settling tank $c$ passes through pipe line $c^2$ and valve $c^3$ into the tank or tanks $d$.

The process may be continued for as many periods as are required until the acid is degraded to a concentration at which it is no longer effective in the reaction.

Operating according to one modification of the invention as hereinbefore described, the plant is charged with its normal quantity of acid and the remainder of the total acid required for a given operational cycle is charged to the tanks $d$, $d^1$. Assuming that the tank or tanks $d$ is or are of sufficient capacity to contain the entire acid requirements for the period, the valves $e^1$, $f^1$ and $f^2$ are closed and valves $c^3$ and $d^2$ open. Sulphuric acid at as high a rate as possible is drawn from tank $d$ through pipe line $c^4$ and valve $d^2$ through the pump $a$, and after passing through the plant it is returned from the settling tank $c$ to the balance tank or tanks $d$, through pipe lines $c^2$ and valve $c^3$. The operation is continued until either the acid has been degraded to a concentration of about 90%, or more or less, if an alkylate of higher quality is required, or until such time that the overall quality of the alkylate produced is equivalent to the "standard" quality produced under usual conditions of continuous operation, if acid economy is required.

Operating according to another modification of the invention hereinbefore referred to, the plant is charged with its normal complement of concentrated sulphuric acid, and a proportion of the remainder of the total requirements for the operational cycle is charged to the balance tank or tanks $d$. The operation is the same as is described in the modification of the invention immediately before described except that fresh acid, for example of 98% concentration is also added through the pipe line $e$ and valve $e^1$ at a rate such that the amount added throughout the operational cycle together with the amount originally added to the plant will not exceed, but may be less than the total acid which would be supplied to the same or similar plant over the same period of continuous operation under known conditions.

The following are examples indicating operating conditions that may be employed in carrying out the invention.

Example 1.—The following is an example of a continuous multi-stage operation in a plant in which the reactors hold 500 tons of acid, and in which over a period of one month 1,700 tons of "make-up" acid are added, in order to maintain the acid concentration in the reactors at 90%. Since the length of run of such a plant will not generally exceed five months, the overall acid consumption including the initial 500 tons charged, averages therefore 1,800 tons per month.

For the sake of clarity acid tonnage throughout relates to tons of 98% acid, that is to say, no allowance is made for increase in acid tonnage due to dilution.

The operational cycle of one month is divided into a number of periods, as for example three, although subject to other conditions the greater the number of periods the greater the improvement effected in quality of the alkylate. During the first period of ten days the plant is charged with 500 tons of 98% acid, and 98% "make-up" acid is added at the rate of 130 tons per day. The corresponding "make-up" acid under known operating conditions would be nearly 57 tons per day. By the end of the tenth day the acid in the plant will have reached a concentration of 95%, but the average concentration of the acid withdrawn from the system is appreciably above this figure and approximates to 96.5%, since the acid discarded in the preceding days will all have been of concentration above 95%. The acid may be piped through a filter to a balance tank in which it is stored under conditions such that reactions causing degradation of the acid are suppressed.

At the beginning of the second period therefore the plant is charged with 95% acid and "make-up" acid of 96.5% concentration is fed to the unit from the balance tank, at a rate equivalent to 130 tons per day. By the end of the second period the acid in the plant will have fallen to about 92.5% concentration, while the acid discharged passes to a second balance tank, and its average concentration at the end of the period is approximately 94%. This acid is used as "make-up" acid in the third period and the acid discarded passes to the first balance tank. At the end of the period the plant contains 500 tons of acid of 89% concentration, and the balance tank 1,300 tons of acid of 91.5% concentration.

Thus during the three periods the effective acid concentration has been respectively 96.5%, 94% and 91.5%, and so the alkylate produced in each period is better both in quality and yield than that produced under the known conditions of operation.

The operation is now carried on for a further period of ten days and the acid in the plant at the end of that period will fall to a concentration of 86%. The acid passed to storage during the period will be of 88.5% concentration, and so the effective concentration during the period will have been 88.5%, and the alkylate produced will accordingly only be slightly below "standard" both in quality and yield.

The operation may now be carried on for a fifth period, wherein the acid in the plant falls to 82% concentration, and the acid passed to storage will have an average concentration of 84.5% and the actual concentration during the period will have been 84.5%, with the result that the alkylate produced will be appreciably below "standard" both in quality and yield.

Thus over the five periods the actual concentrations were respectively 96.5%, 94%, 91.5%, 88.5% and 84.5%, being on the average for the fifty days, an acid concentration of 91%. Thus if the alkylate products of the respective periods are bulked together, the composite alkylate product is slightly better both in yield and quality than "standard" alkylate.

When a continuous plant such as referred to in this example is operated according to known practice by maintaining an acid concentration of 90% in the reactors, there is produced approximately 17,500 tons of "standard" alkylate boiling in the motor spirit range, while during the fifty days of operation 3,000 tons of acid will be degraded from 98% concentration to 90% concentration of acid.

Operating according to the modification of the process last described, approximately 17,500 tons of "standard" alkylate is produced, while during the fifty days of operation 500 tons of acid will have been degraded from 98% concentration to 82%, and 1,300 tons from 98% to 84.5% concentration, making a total saving of approximately 40% of the total acid requirements.

*Example 2.*—In the operation of the modification of the invention described with reference to the continuous alkylation unit described in Example 1, one or more balance tanks are added to the unit, to a total capacity of 1,300 tons, and the plant is operated under known conditions except that the acid to the pump is drawn from the balance tank, while the acid already used in the process returns to the balance tank from the settling tanks. Operating according to this method the effect obtained is the same as would be obtained by known batch operation. By the end of the month, the acid is reduced in strength to a concentration of 90% but the average acid concentration throughout the month is of the order of 94%. It follows that the overall quality of the alkylate will therefore be superior to the quality obtained in continous operation under known conditions.

Alternatively the operation may be continued for a further period up to 20 days, during which time the acid will be degraded to a level such that the overall quality of alkylate obtained during the complete period is equal to "standard" quality alkylate. Thus, if the period of time required to bring the acid strength down to 85%, or even as low as 82% is 20 days, the acid saved during the period of 50 days will amount to 1,200 tons, which represents an acid saving of about 40%.

In operation according to the third modification of the invention, the plant may be charged with 500 tons of acid as before, and 650 tons are supplied to the balance tank, which should still be of a total capacity 1,300 tons. The remaining 650 tons will then be added as "make-up" acid over a period of one month if a higher quality of alkylate is required, or over a correspondingly longer period if "standard" quality alkylate is satisfactory and acid economy is aimed at.

It will thus be understood that operating according to the invention one of the chief disadvantages of batch operation is avoided, viz., the necessity for frequent interruptions. The length of run obtainable will depend on balance tank capacity, but taking other considerations into account, such as the tendency of the acid to degrade itself, it has been found that the periods indicated are particularly advantageous.

Many modifications of process conditions are possible without departing from the invention. Thus for example the operation with no "make-up" acid and with half the usual quantity of "make-up" acid have been referred to, but the proportions may be widely varied.

It will thus be understood that the invention is applicable either to single or multi-stage plants or units and that the process conditions are capable of modification or variation with practical advantage within wide limits. Thus for example in the operation of a three-stage unit in which the catalyst passes from the settling tank of one reaction stage to the reactor of the next, and in which the feed of the reactants and acid is separately made to each reactor, the application of the process of the invention on a "three period" basis may yield the equivalent of nine separate stages. Thus in operation during the first period, "make-up" acid might be supplied to the first reactor at 98% strength and degraded to say, 97%. The 97% acid might then pass on to the second stage and at that stage be degraded to 96%, and the 96% acid might then pass to the third stage and there be degraded to 95%, and the 95% acid might then pass to the storage tank for use as "make-up" acid during the second operational period. The acid might finally be rejected at the end of the third period, at say 89% strength, and thus during the operation nine different qualities of alkylate might thus be produced, seven of them being better than "standard" quality.

It will however be understood that the invention is not limited to the use of particular higher average concentrations of acid as catalyst in the resepctive periods or stages of operation. It is however one of the objects of the invention to maintain the highest convenient acid concentrations in the periods or stages, and to inject the acid at very high velocity, and at much higher velocity than usually employed in processes of alkylation of the lower isoparaffins. Thus greater proportions of acid are employed. The higher average acid concentrations hereinbefore indicated while they are advantageous are exemplary of concentrations that may be usefully employed under the conditions described.

In order that the full advantage of the invention may be obtained, some provision is necessary with a view to prevent acid in the balance tanks degrading itself. A number of known possibilities present themselves. Thus auto-refrigeration may be advantageously and conveniently employed, in which the acid is stored in contact, for example with isobutane, and the isobutane may be evaporated at a rate sufficient to maintain a determined low temperature in the balance tank whereby degradation is inhibited. Such a period is advantageous in that any olefin carried forward from the settler will tend to react with the isobutane rather than with the acid, and the energy used in cooling the acid may thus not be entirely lost, since a lower cooling capacity will be necessary in the plant itself.

I claim:

1. A process for the alkylation of hydrocarbons comprising charging an alkylation reaction zone with fresh liquid acid catalyst of high concentration; flowing into said zone a combined stream of an olefin reactant, an isoparaffin reactant substantially in excess of equimolecular proportion with respect to olefin, and a liquid acid catalyst of concentration at least as high as that of the catalyst in said zone and at a rate to maintain the concentration of the acid in the reaction zone appreciably above the average concentration of the acid in an operational cycle; subjecting the reactants in said zone to alkylation at a low temperature, under pressure necessary to maintain the liquid phase and under conditions of turbulence induced by a high flow rate of said stream until the catalyst in said zone has been reduced in concentration to the extent determined by the quality of the alkylate desired; continuously withdrawing a stream of the reaction mixture and catalyst at the same rate from said reaction zone and conducting at least a portion of said stream into a quiescent settlement zone of large capacity, in which the catalyst, to some extent reduced in concentration and catalytic activity, according to the period of contact in said reaction zone, but still of high concentration, is separated from the reaction mixture; separating and recovering the alkylate as a desired product from said reaction mixture; passing the separated catalyst to a storage zone of large capacity and accumulating a body of liquid acid catalyst therein of average concentration appreciably above that of the acid catalyst in said reaction zone; and, during the operational cycle, recycling liquid acid catalyst from said body to said reaction zone as liquid acid catalyst of said combined stream and to serve as "make-up" acid catalyst in said reaction zone.

2. The process of claim 1 in which the operational cycle is divided into at least two periods in the first of which the liquid acid catalyst of said combined stream consists of fresh liquid acid catalyst of high concentration from an external source and in which in the succeeding period the catalyst of said stream consists of liquid acid catalyst drawn from said storage zone.

3. The process of claim 1 in which said storage zone is initially charged with fresh liquid acid catalyst of high concentration and in which the liquid acid catalyst of the combined stream is drawn wholly from said storage zone.

4. The process of claim 1 in which said storage zone is initially charged with fresh liquid acid catalyst of high concentration and in which the liquid acid catalyst of the combined stream consists in part of liquid acid catalyst drawn from said storage zone and in part of fresh liquid acid catalyst from an external source.

ALEXANDER PATERSON SHEARER.

REFERENCES CITED

The following references are of record in the file of this patent:

UNITED STATES PATENTS

| Number | Name | Date |
| --- | --- | --- |
| 2,001,910 | Ipatieff | May 21, 1935 |
| 2,211,747 | Goldsby et al. | Aug. 13, 1940 |
| 2,341,863 | Goldsby | Feb. 15, 1944 |
| 2,346,770 | Lobdell et al. | Apr. 18, 1944 |
| 2,348,815 | Horton et al. | May 16, 1944 |
| 2,370,164 | Hemphill | Feb. 27, 1945 |
| 2,396,198 | Pevere et al. | Mar. 5, 1946 |